(12) United States Patent
Schauss et al.

(10) Patent No.: US 6,349,912 B1
(45) Date of Patent: Feb. 26, 2002

(54) SUPPORTING STRUCTURE

(75) Inventors: Peter Schauss, Flörsheim; Wilhelm Born-Fuchs, Hofheim-Wallau, both of (DE)

(73) Assignee: DE-STA-CO Metallerzeugnisse GmbH, Steinbach (DE)

( * ) Notice: Subject to any disclaimer, the term of this patent is extended or adjusted under 35 U.S.C. 154(b) by 0 days.

(21) Appl. No.: 09/510,464

(22) Filed: Feb. 22, 2000

(30) Foreign Application Priority Data

Mar. 27, 1999 (DE) ..................................... 299 05 687 U

(51) Int. Cl.7 .................................................. E01S 7/18
(52) U.S. Cl. .................................. 248/298.1; 248/228.1
(58) Field of Search .......................... 248/298.1, 228.1, 248/228.5, 230.1, 230.5, 231.61

(56) References Cited

U.S. PATENT DOCUMENTS

| 3,955,788 A | * | 5/1976 | Delage ..................... 248/228.3 |
| 5,520,292 A | * | 5/1996 | Lombardi .................. 211/85.6 |
| 5,615,854 A | * | 4/1997 | Nomura et al. ........... 248/287.1 |
| 5,649,768 A | * | 7/1997 | Ohzono et al. .............. 384/43 |
| 5,651,519 A | * | 7/1997 | Goodrich et al. ............. 248/51 |
| 5,742,982 A | * | 4/1998 | Dodd et al. .................. 24/16 R |
| 5,816,736 A | * | 10/1998 | Kroulik ..................... 403/389 |

FOREIGN PATENT DOCUMENTS

| DE | 28 06 557 | | 8/1978 |
| DE | 37 36 266 | | 5/1989 |
| FR | 2566310 | * | 6/1984 |
| GB | 2 275 737 | | 9/1994 |

* cited by examiner

*Primary Examiner*—Anita King
(74) *Attorney, Agent, or Firm*—Collard & Roe, P.C.

(57) ABSTRACT

The invention is related to a supporting structure, especially for attachment to a robot arm and for securing tools, such as clamping, gripping and suction devices or other equipment such as valves, sensors and the like. The supporting structure is formed of not less than two shaped bars and of at least one clamping member. The clamping member conforms to the profile of the bars and is formed of at least two parts, and the shaped bars are provided with at last one undercut groove, with an adjusting strip being arranged within the said groove and being displaceable and firmly clamped therein. Provided both within the clamping member and within the adjusting strip, for insertion of an adjusting pin, are adjusting ports adapted to be placed in registry by a relative displacement of the adjusting strip and the clamping member, with the said adjusting ports being of identical diameters.

7 Claims, 4 Drawing Sheets

SUPPORTING STRUCTURE

BACKGROUND OF THE INVENTION

1. Field of the Invention

The present invention is related to a supporting structure, in particular, for attachment to robot arms and for securing tools such as clamping, gripping and suction devices or other equipment, such as valves, sensors and the like, and more particularly is related towards elements provided on such supporting structures for precisely positioning the same relative to one another.

2. Description of the Prior Art

Supporting structures or supporting devices of the afore-described type have been taught, for example, by German Patent Application No. 28 06 557. Supporting structures or structure building systems of this type which, conventionally and as a rule, are attached to robot arms, are used for transporting workpieces (e.g. body sheets) from one processing location to another, with one of the mandatory requirements being the precise seizure and deposition of the workpieces in addition to the basic variability requirement to enable such equipment to adapt to existing local conditions and special workpiece designs, and also to comply with specific space orientations of the workpieces. The conventional systems of this type appear to comply only inadequately with the afore-described requirements. Concerning supporting structure building systems of a similar design reference is, in addition, made to UK Patent Application No. 2 275 737 and German Patent Application 37 36 266 A1.

In respect of supporting structures composed of shaped bars and clamping elements it is of importance that the clamping members, irrespective of whether they interconnect two bars or whether they serve as supports for special tools on bars, be precisely positioned with respect to one another, proceeding, as a rule, from a predetermined point of reference of, e.g. a robot arm carrying the entire supporting structure and moving the same into the most different positions. Especially when attached to a robot arm, it is, moreover, important that the position of the bars and of the clamping members once adjusted with respect to one another be precisely reproducible in case of displacement of the predetermined adjustment of the clamping members which is likely to occur in case of interference with an obstacle.

This precise positioning and reproducibility requirement, hitherto, has been met by conventional supporting structures of the afore-mentioned type only inadequately and in a time-consuming way, yielding more or less precise results by using measuring poles, inch rules, tape measures and the like equipment to measure the distances of suitable edges or rims of the clamping members and then fixing the same on the bars.

OBJECTS AND SUMMARY OF THE INVENTION

It is, therefore, a primary object of the present invention to provide a new and improved supporting structure which overcomes the deficiencies noted above with respect to the prior-art supporting structures.

Another object of the present invention is to provide an improved supporting structure wherein the required positioning, initially, can be performed independently of the clamping members on the bars whereafter the clamping members are moved to the adjusted positions and fixed therein in an oriented way. An additional object of the present invention is to provide an improved supporting structure readily enabling a precise reproduction of pre-adjusted positions of the clamping members.

A still further object of the present invention is to provide an improved supporting structure of a design such that displacements, if any, of the clamping members are automatically detected.

The afore-going and other objects are attained in accordance with one aspect of the present invention through the provision of a supporting structure, which comprises the following features:

arranged within the groove is an adjusting strip adapted to be clamped therein, and provided both within the clamping member and within the adjusting strip, for accommodating an adjusting pin, are adjusting ports adapted to be placed in registry by a relative displacement of adjusting strip and clamping member.

The supporting structure of the invention will meet the requirements placed upon the same, as it is no longer the clamping members as such but only the strips or lockers that will have to be adjusted involving substantially less efforts as the adjusting ports are available for positioning the strips. For precisely adjusting the distance between two strips by a given measure, a special scale is used which comprises two small cones adjusted to the precise distance required and centrally insertable into the adjusting ports of the strips. Once the two strips are fixed in this position within their groove, the clamping members are then mounted in an approximately corresponding position on the respective bar and with the aid of an adjusting pin are placed into the precise position in that the said pin is first pushed into the adjusting port of the clamping member and after being placed in registry with the adjusting port provided in the strip is also pushed thereinto.

Preferably, the end of the adjusting pin to be inserted is of a slightly conical configuration. However, also the edge of the adjusting port within the strip can be of a slightly conically chamfered configuration yet to be explained in closer detail hereinafter.

After an adjusted association of the clamping members to the respective strip, the clamping members are fixed to the bar to then again draw, i.e. remove, the adjusting pin.

This will not only readily permit an accurate positioning of the clamping members but will also enable such accurate position, if need be, to be reproduced without requiring any re-measuring steps as the strips remain within the grooves of the bars in a position precisely adjusted and fixed even if the clamping members have been displaced for whatever reason.

BRIEF DESCRIPTION OF THE DRAWINGS

Various Objects, features and attendant advantages of the present invention will be more fully appreciated as the same becomes better understood from the following detailed description thereof when considered in connection the with accompany drawings, wherein.

DETAILED DESCRIPTION OF THE PREFERRED EMBODIMENTS

Figure 1:
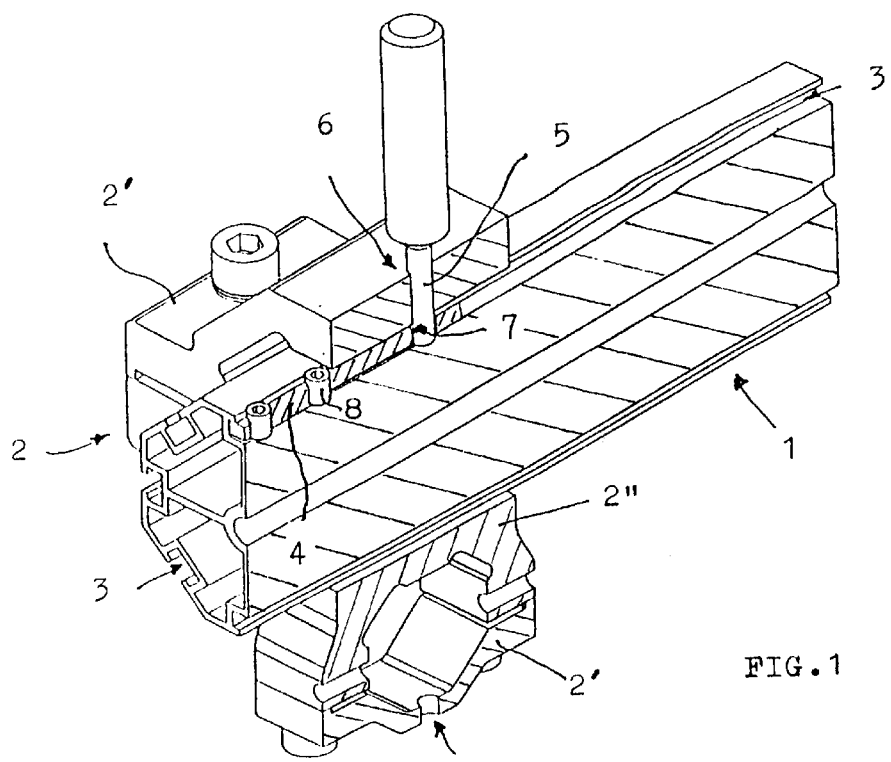
FIG. 1 is a perspective and sectional view of a supporting bar with a clamping member arranged thereon.

Referring to the drawings, the supporting structure still comprises not less than two supporting bars 1 detachably interconnected by at least bi-partite clamping members 2 conforming to the bar profile. The supporting bars 1 are provided with at least one undercut groove 3. In all of the following examples of embodiment to be individually described hereinafter, the supporting bars are shown in the form of octagonal hollow profiles which, in part, have four and eight grooves 3; however, this is not mandatory, i.e. also other profile cross-sections can be considered in respect of the supporting bars 1.

Figure 6:
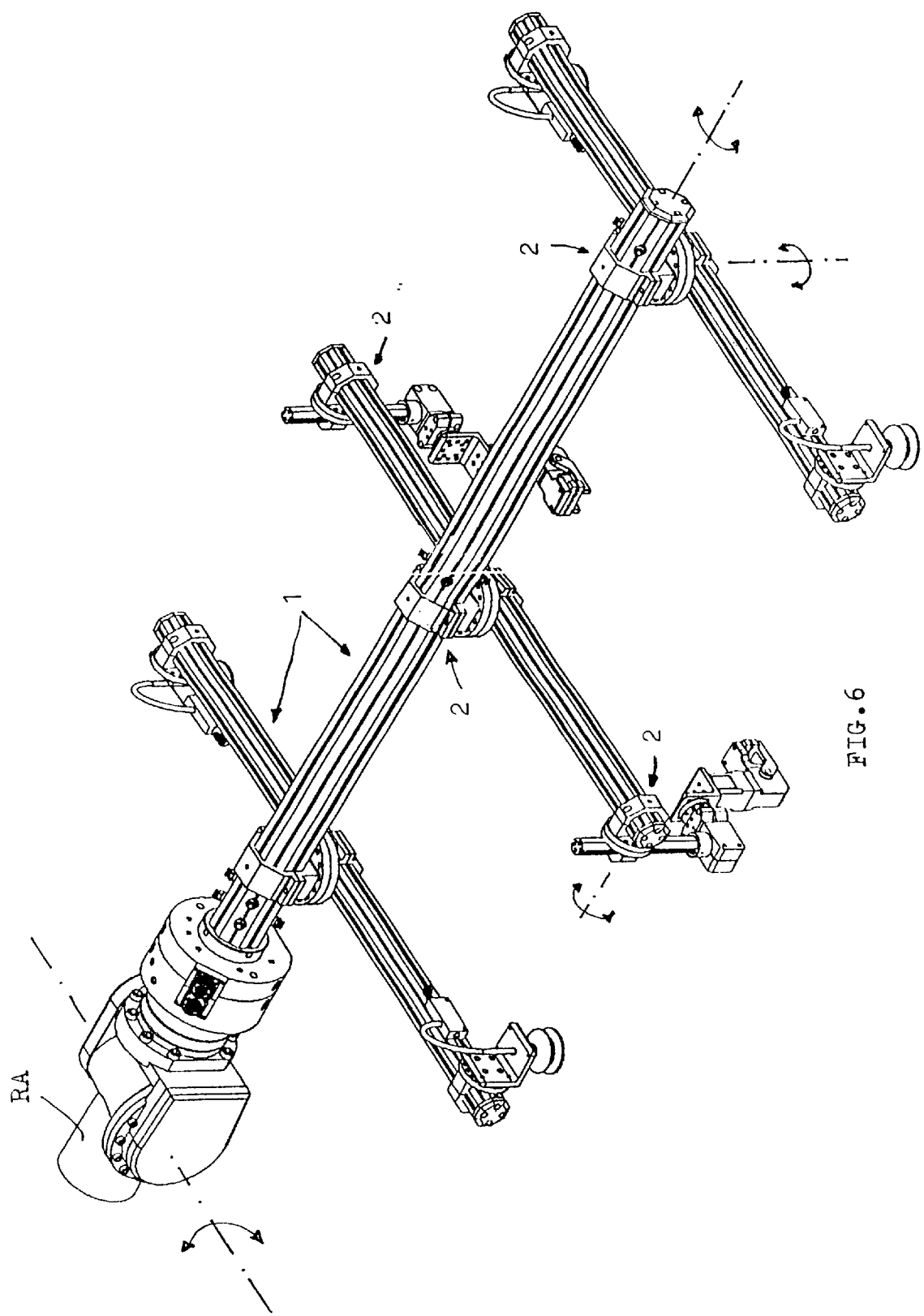
FIG. 6 is a perspective view of an embodiment of a supporting structure arranged on the end of a robot arm.

FIG. 6 is a general view of an example of embodiment of a supporting structure of this type having a total of four supporting bars 1 including the clamping members 2 attached thereto and arranged on a robot arm RA.

In reference to FIG. 1 it is of importance to the supporting structure of the invention, relative to the clamping members and the accurate positioning thereof that an adjusting strip 4 be provided in groove 3 in a manner adapted to be clamped therein, and that adjusting ports 6,7 adapted to be registered by a relative displacement of adjusting strip 4 and clamping member 2 for accommodating an adjusting pin 5 be provided both within the clamping member 2 and within the adjusting strip 4. For reasons of an easier understanding of the arrangement of the adjusting strip 4 between shaped bar 1 and clamping member 2, these units which in the present instance are of a tripartite configuration, and the adjusting strip are shown bisected.

Figure 2:
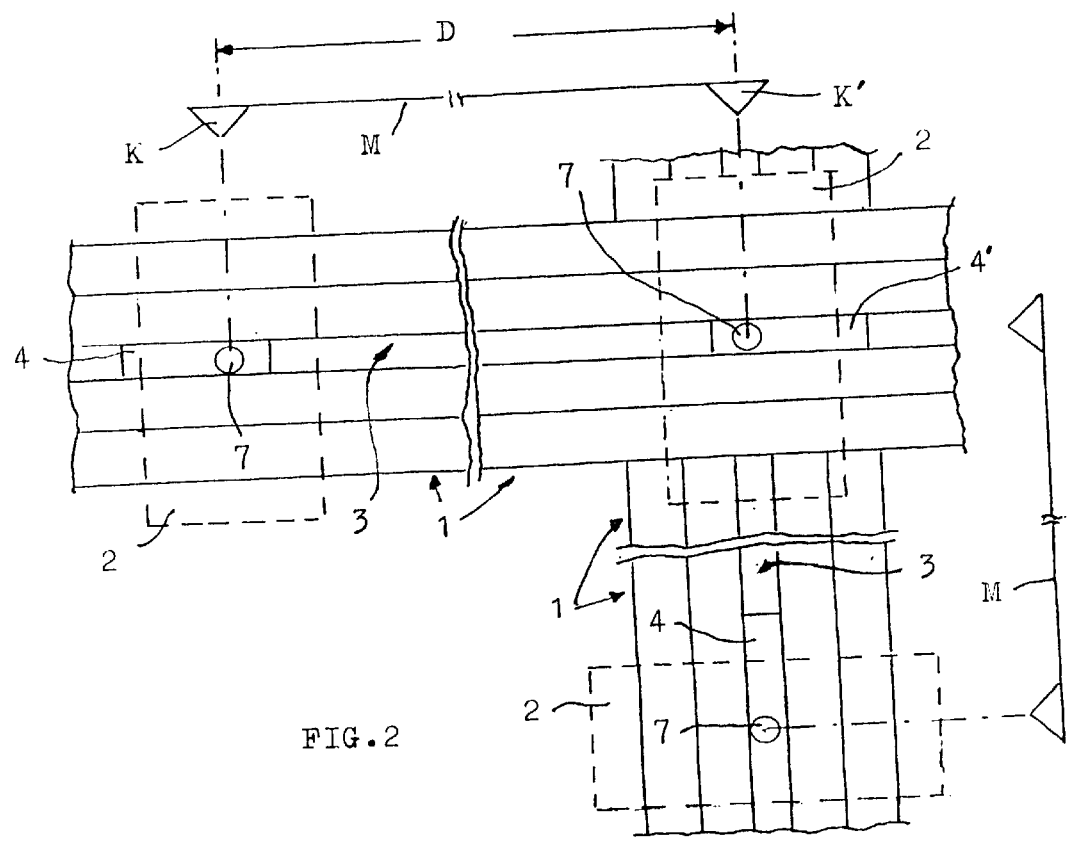
FIG. 2 basically shows a plan view of two crossing support bars along with clamping members and associated auxiliary positioning elements.

FIG. 2 generally shows how to proceed to positioning. A number of adjusting strips 4 corresponding to the number of clamping members 2 to be arranged on and fixed to a supporting or shaped bar 1, are pushed into the respective groove 3. Based, for example, on the end of a supporting bar 1 as a point of reference, a first adjusting strip 4 is so clamped within the groove 3, that the adjusting port 7 thereof with its center has a precisely predetermined distance from the bar end or from another predetermined reference point. For positioning a second adjusting strip 4', an adjustable scale M provided with small centering cones, with one of its small cones K is mounted on or inserted into the adjusting port 7 of the adjusting strip 4 already positioned and fixed, i.e. due to the conical shape, precisely in the center thereof, while the second adjusting strip 4' also pushed into the groove 3 with the adjusting port 7 thereof is displaced underneath the second cone K' of the scale M which is adjusted to the required distance D on the scale. During insertion of the cone K' into the adjusting port 7, both adjusting ports 7 exactly have thus the required distance D, whereafter also the second adjusting strip 4 is fixed to or clamped within the groove 3. To insure fixation, the adjusting strips 4 are provided with two threaded bores and a grub screw 8 as shown, for example, in FIGS. 1, 2. Positioning is performed for all points on all bars of a supporting structure on which clamping members 2 are to be located.

Figure 3:
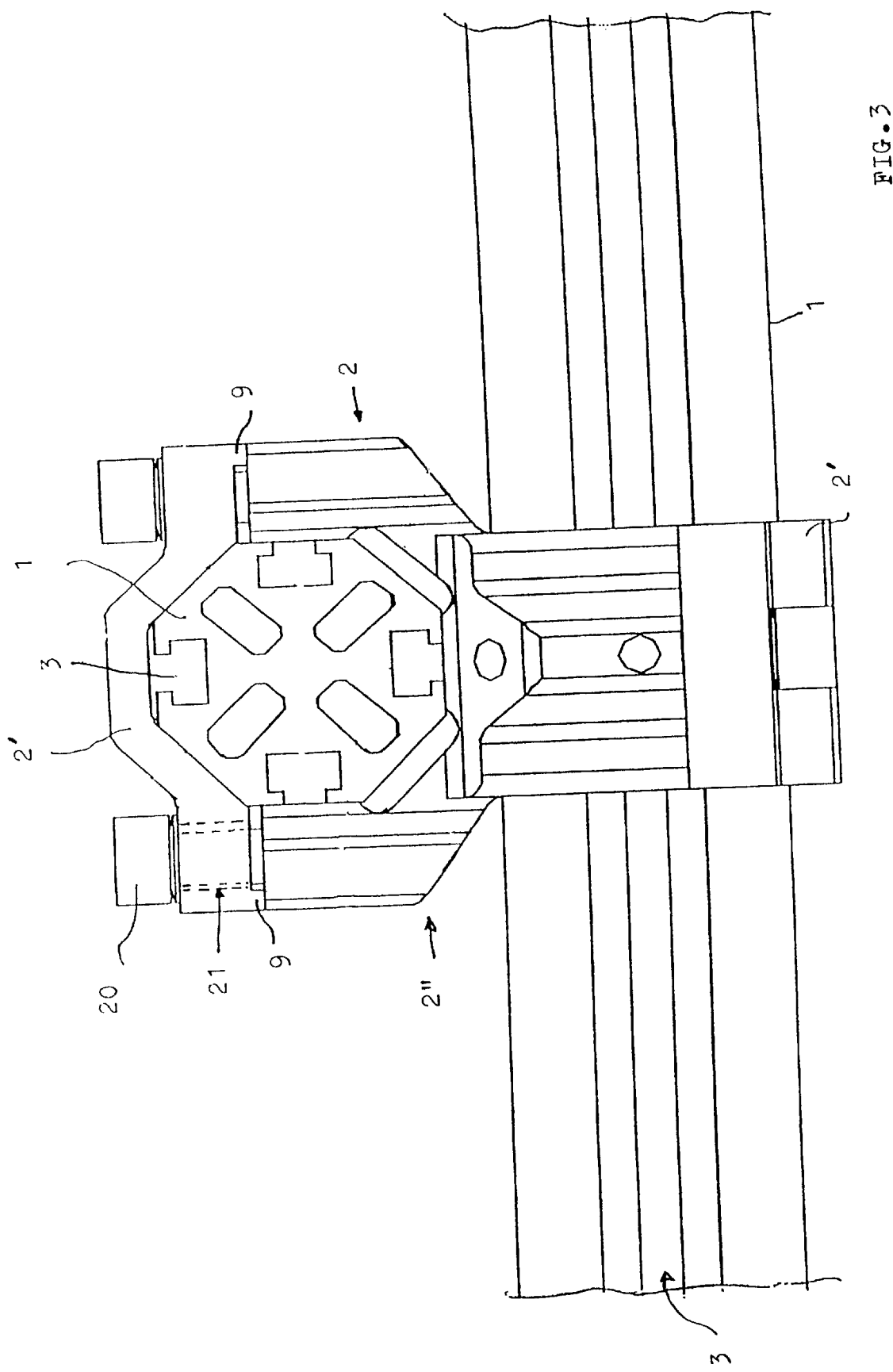
FIG. 3 shows a clamping element along with two crossing bars held thereby.
Figure 4:
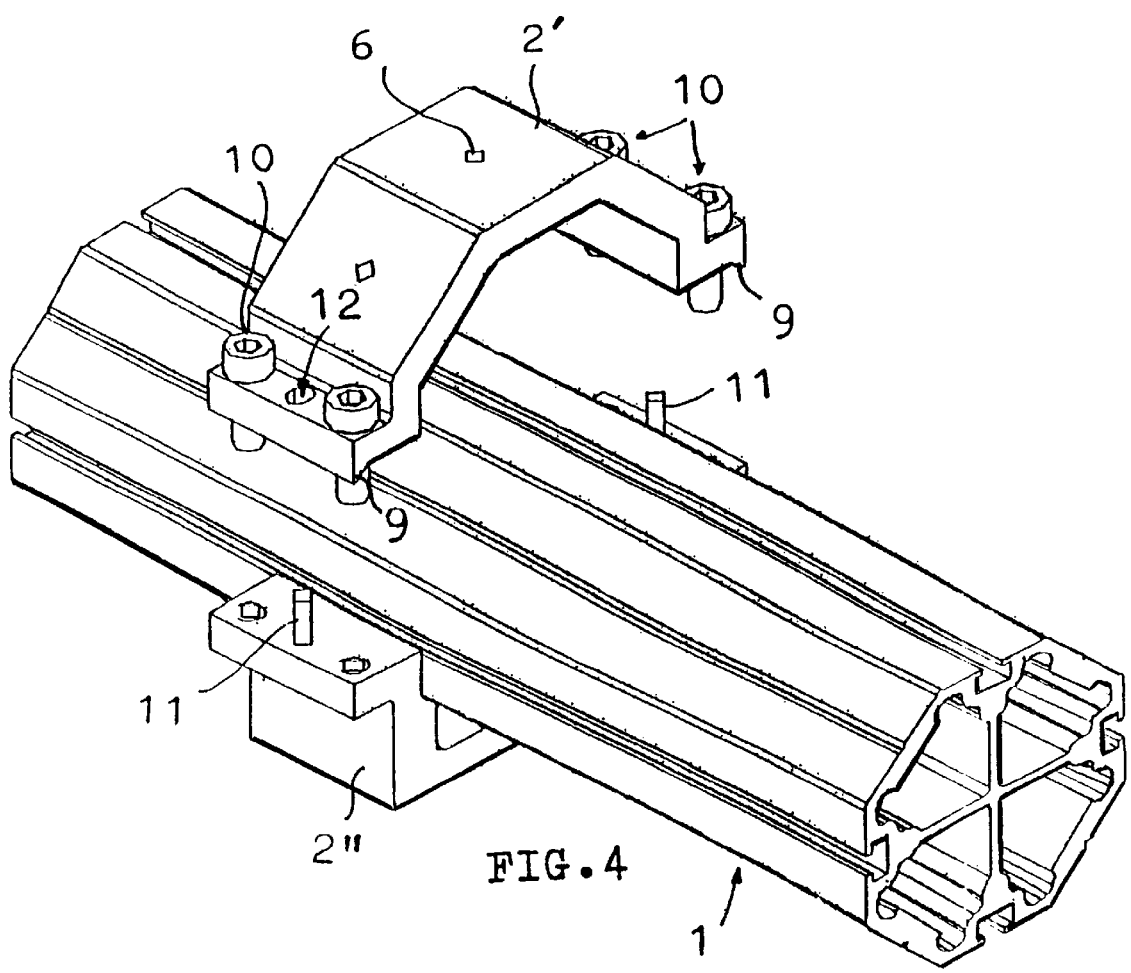
FIG. 4 is a perspective view of a special form of embodiment of a clamping member along with an associated supporting bar.

After positioning, the clamping members 2 are mounted on bars 1 and, initially, are screwed only loosely so as to enable subsequent displacement thereof on the shaped bars 1. The clamping members 2 which, depending on their functions, are of a bi-partite (FIG. 4) or a tri-partite (FIG. 3) configuration, will now be displaced by the eye across the positioned adjusting strips 4 in such a way that their adjusting ports 6 approximately are in registry with the adjusting ports 7 of the adjusting strips 4. For the precise registry of the said ports 6,7, the adjusting pin 5 is inserted to thereby insure precise positioning of the respective clamping member 2. With the adjusting pin 5 still inserted, the respective clamping member 2 is clamped to the respective shaped bar 1 by means of nuts 20 (see FIG. 1). After positioning and fixation of a clamping member 2, the adjusting pin 5 is removed.

As parts 2' of the clamping members to be clamped by bolting are required to have passage ports 21 (see FIG. 3) that are of a slightly larger diameter than nuts 20, a certain play is formed on these parts. To account also for that play towards precise positioning of the clamping members 2 it is advantageous, in reference to FIG. 4, that part 2' of the clamping member provided with the adjusting port 6 be configured in the form of a bracket provided with marginal supports 9 and that the same at each end thereof be fixed by two nuts 10 to the other part 2" of the clamping member, with a fitting oblong hole 12 extending in the bracket direction being provided between the nuts 10 in one of parts 2', 2" in registry with a fitting pin 11 within the respectively other of said parts 2', 2", which oblong hole 12 is engaged by the fitting pin 11. Fitting pin 11 and fitting oblong hole 12 insure a central association of parts 2', 2" with respect to one another, with the formation of an oblong hole 12 having the following meaning:

Especially when using supporting structures of this type on robot arms RA the fixation of the clamping members 2 to their bars 1, on the one hand, must be such that the clamping members 2 are adequately firmly seated, and on the other hand, must be slightly displaceable in case of collision. These requirements are met by the above defied configuration of parts 2' of the clamping member provided with edge supports 9 thereby imparting to the bracket forming part 2' of the clamping member a slightly higher flexibility, which, in turn, results in a deformation of the bracket during bolting. The provision of the oblong hole 12 takes account for such a deformation which hole only has a side guiding function for the fitting pin 11.

Figure 5:
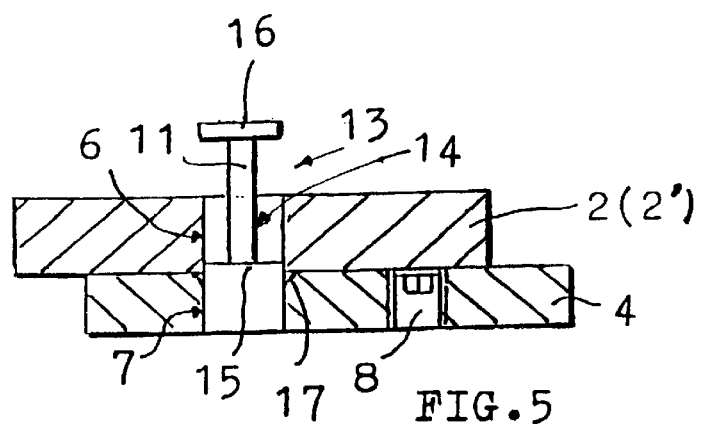
FIG. 5 is a sectional view, on an enlarged scale, of another special form of embodiment.

Referring to FIG. 5, an advantageous form of embodiment resides in that a so-called control pin 13 of a shearing material is located within the typically provided adjusting ports 6, 7, with the said pin 13 protruding from the adjusting port 6 of the clamping member 2 or parts 2' thereof, respectively. Hence, a permanent visual control for the properly maintained and correct positioning of the respective clamping member is insured. For, in the event of a displacement of a clamping member during use of a supporting structure, the control pin is sheared, dropping sooner or later from the adjusting ports 6,7, to be independent of such a drop, the control pin 13, in part 14 passing through the adjusting port 6 of part 2' of the clamping member, except for the shear portion 15, preferably, is of a diameter smaller than that of the adjusting port 6. A displacement on shaped bar 1 caused, for example, by an external interference with or loosening of the bolt on clamping member 2, in which the adjusting strip 4 and, hence, the adjusting port 7 does not take part because its being firmly clamped within groove 3, will result in shearing or at least beveling of the protruding part of control pin 13 indicating that the clamping member 2 has displaced and positioning no longer is correct.

Preferably, the control pin 13 is of a color different than that of the clamping member 2 (for example red-colored); furthermore, the control pin 13 at the protruding end thereof can be of a shaping 16 different from the pin shape, as also shown in FIG. 5.

Incidentally, FIG. 5 also shows the afore-mentioned chamfer 17 of the adjusting port 7 within the adjusting strip 4. Such a chamfer also can be provided on the adjusting port 6, unless the adjusting pin 5 is itself chamfered.

Obviously, numerous modifications and variations of the present invention are possible in the light of the above teachings. It is, therefore, to be understood that within the scope of the appended claims the invention may be practiced otherwise than as specifically described therein.

What we claim is as follows:

1. A supporting structure, comprising at least two shaped bars and at least one clamping member, wherein the clamping member conforms to the profile of the bars and is formed of at least two parts;

the shaped bars are respectively provided with at least one undercut groove;

arranged within the groove is an adjusting strip displaceable and firmly clamped therein;

arranged both within the clamping member and within the adjusting strip for insertion of an adjusting pin are adjusting ports adapted to be placed in registry by a relative displacement of the adjusting strip and the clamping member, the adjusting ports being of the same diameter.

2. The supporting structure as set forth in claim 1, wherein the adjusting strip is provided with at least one threaded bore and a grub screw for clamping the adjusting strip within the groove.

3. The supporting structure as set forth in claim 1, wherein one part of the clamping member formed at least in two pieces is in the form of a clamping bracket;

the clamping bracket on each end is provided with an edge support and in the center thereof is provided with the adjusting ports;

the clamping bracket on each end is fixed by two nuts to the other part of the clamping member;

arranged between screws within one or the other of said parts of the clamping member in registry with a fitting pin located within the respectively other of said parts of the clamping member is a fitting oblong hole extending in the direction of the bracket, with the fitting pin engaging the oblong hole.

4. The supporting structure as set forth in claim 1, wherein arranged within the adjusting ports in registry with respect to one another is a control pin of easily shearing material, the control pin being so dimensioned in length that the control pin protrudes from the adjusting ports of the clamping member.

5. The supporting structure as set forth in claim 4, wherein the control pin in a part thereof passing through the adjusting ports of the clamping member, except for a shear part, is of a diameter smaller than that of the adjusting ports.

6. The supporting structure as set forth in claim 4, wherein the control pin is of a different color than the clamping member accommodating the control pin.

7. The supporting structure as set forth in claim 4, wherein the control pin on a protruding end thereof is of a shaping differing from the shape of the remainder of the control pin.

* * * * *